March 11, 1952 W. S. OFTERBRO ET AL 2,588,756
AUTOMOBILE AIR CONDITIONER
FOR DRIVE-IN THEATERS
Filed June 13, 1949 4 Sheets-Sheet 1

Inventors
Wm. S. Oftebro
Wm. E. Fleming
By
ATTORNEYS

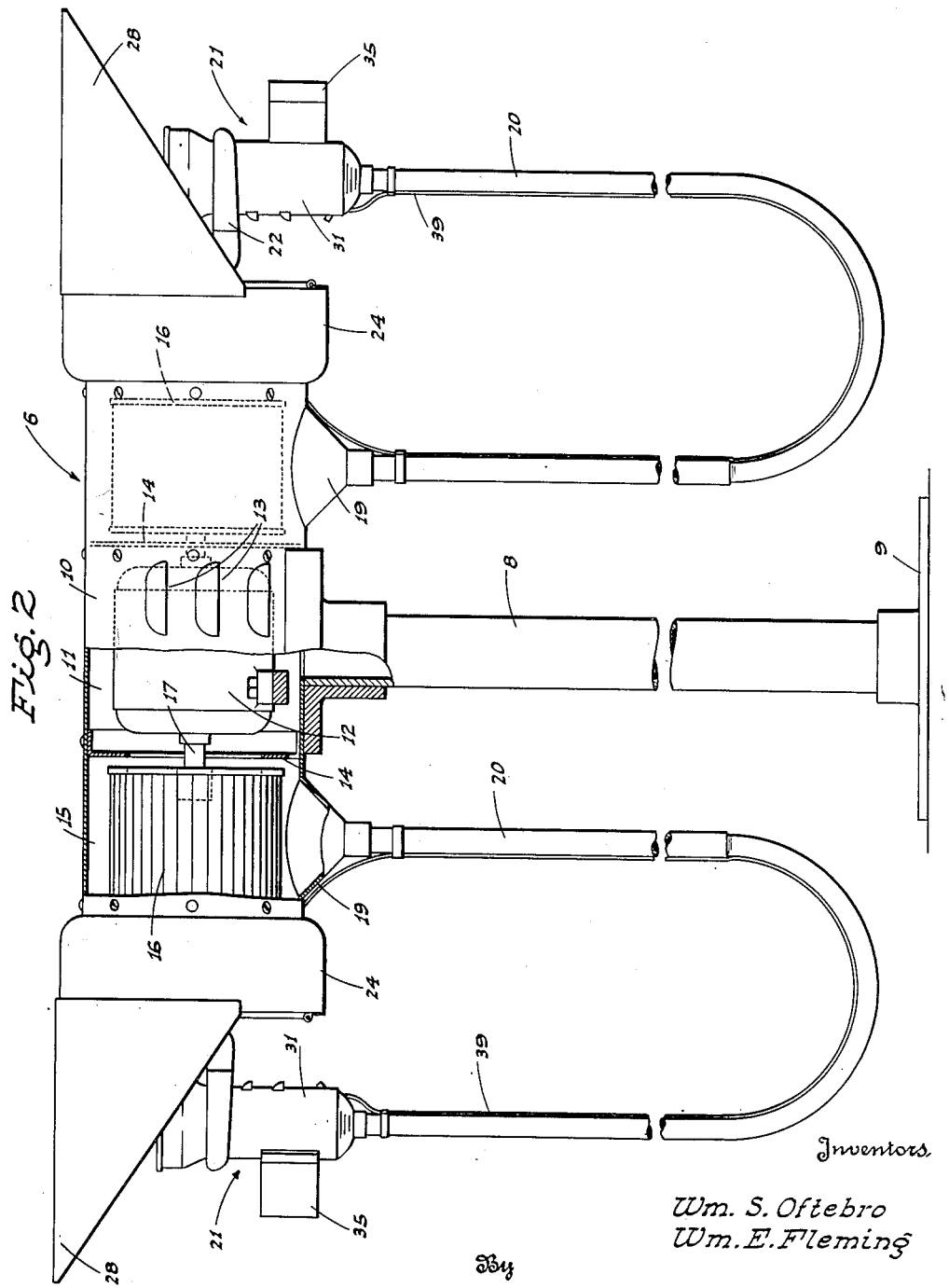

March 11, 1952     W. S. OFTERBRO ET AL     2,588,756
AUTOMOBILE AIR CONDITIONER
FOR DRIVE-IN THEATERS
Filed June 13, 1949     4 Sheets-Sheet 3
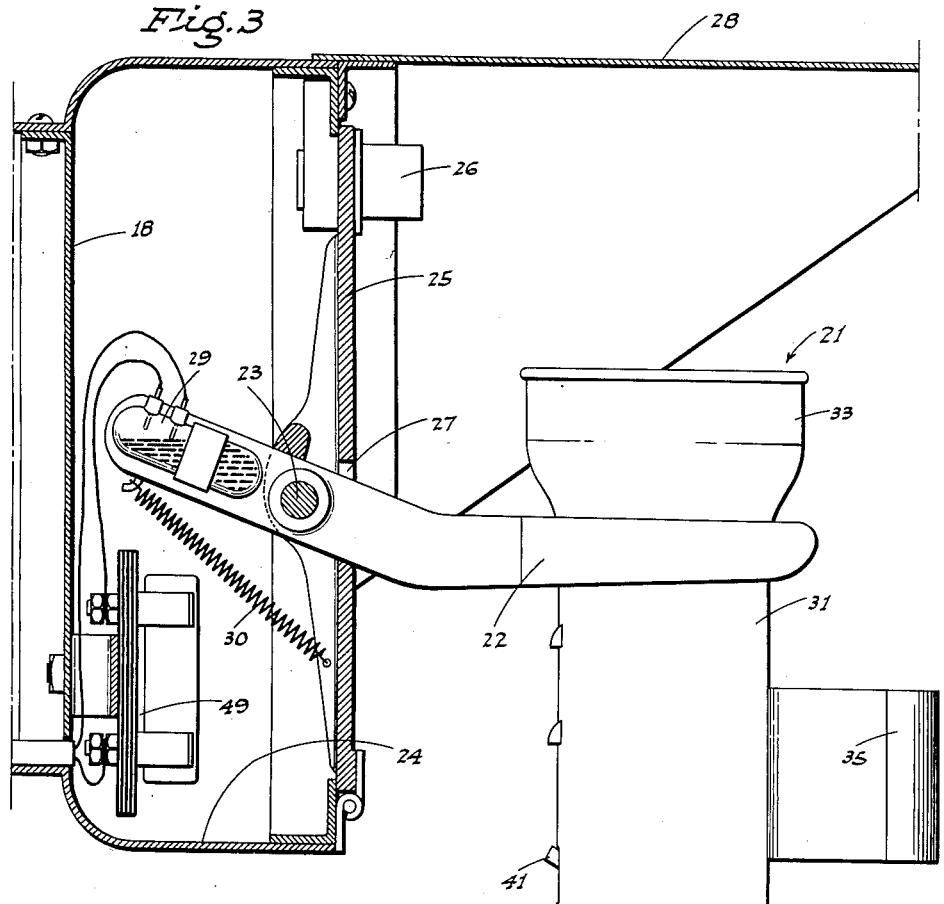
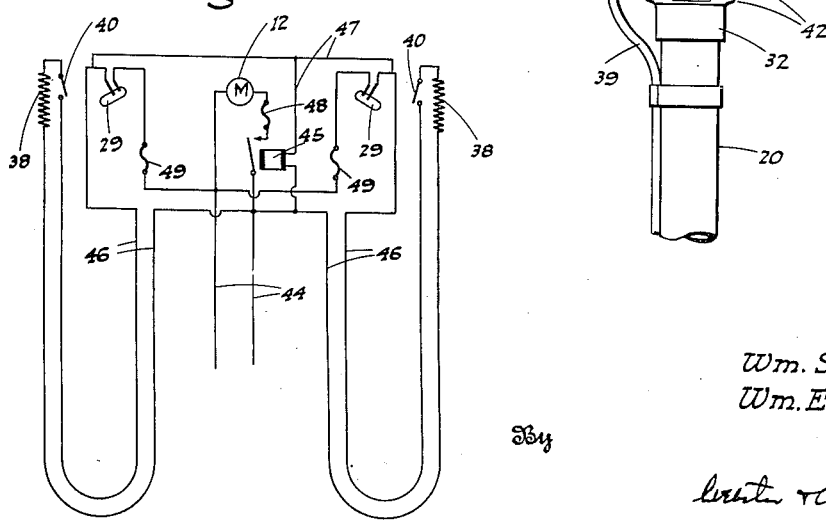
Inventors
Wm. S. Oftebro
Wm. E. Fleming
By
ATTORNEYS Inventors
Wm. S. Oftebro
Wm. E. Fleming By

ATTORNEYS

UNITED STATES PATENT OFFICE 2,588,756

AUTOMOBILE AIR CONDITIONER FOR DRIVE-IN THEATERS

William S. Oftebro and William E. Fleming, Stockton, Calif.

Application June 13, 1949, Serial No. 98,682

3 Claims. (Cl. 219—39)

This invention is directed to, and it is an object to provide, an air conditioner, especially a heater, for automobiles parked at a drive-in theater or the like.

By employing the present invention, operation in cold weather of the engines of the automobiles to maintain their heaters working is unnecessary, and this avoids the discharge of dangerous exhaust gases in the crowded parking area. Also, an economy results in the saving of fuel otherwise consumed by such operation of the automobile engines.

Another object of the invention is to provide a plurality of automobile air conditioning units in novel combination with a drive-in theater which includes parkways in which a plurality of automobiles are parked in side by side relation. The invention contemplates a separate air conditioner mounted between adjacent individual parking areas in which a pair of automobiles are adapted to park; each such air conditioner being arranged to service said pair of automobiles.

A further object of the invention is to provide air conditioning units as above wherein each thereof includes a fresh air blower assembly mounted between said adjacent parking areas, and having dual air delivery hoses adapted to lead in opposite directions from the blower assembly to automobiles parked in said adjacent areas; there being an electric heater unit on each hose to heat the air flowing therethrough into the corresponding automobile.

A separate object of the invention is to provide air conditioning units, as in the preceding paragraph, wherein the electric heater units are each of novel construction; each such heater unit being secured on the free end of the corresponding air delivery hose and including means to suspend such unit in an automobile for use. Each heater unit embodies a readily manually accessible "on-off" switch for control by an occupant of the automobile; the blower assembly continuing to supply fresh air into the automobile even when the heater unit is off.

An additional object of the invention is to provide an automobile air conditioning unit wherein the electric heater units and the associated air delivery hoses—when not in use—removably suspend from a corresponding circuit breaking hook on the blower assembly; the latter being electric motor driven and in circuit with the heater units in a manner which requires both thereof to be on their circuit breaking hooks before said electric motor driven blower assembly shuts off.

It is also an object of the invention to provide an automobile air conditioning unit, for the purpose described, which is practical, effective, and convenient to use; there being no annoying noise in the automobile, as the blower assembly is mounted exteriorly thereof.

A further object of the invention is to provide an automobile air conditioning unit which is reliable, and economical to operate and maintain.

These objects are accomplished by means of such structure and relative arrangement of parts as will fully appear by a perusal of the following specification and claims.

In the drawings:

Fig. 2 is a side elevation, partly in section and partly broken away, of one of the post supported air conditioning units.

Fig. 3 is an enlarged fragmentary sectional elevation of one end of the blower assembly showing the related circuit breaking hook, and its heater unit and air delivery hose suspended therefrom.

Fig. 7 is a diagram of a control circuit which may be used with each air conditioning unit.

Figure 1:
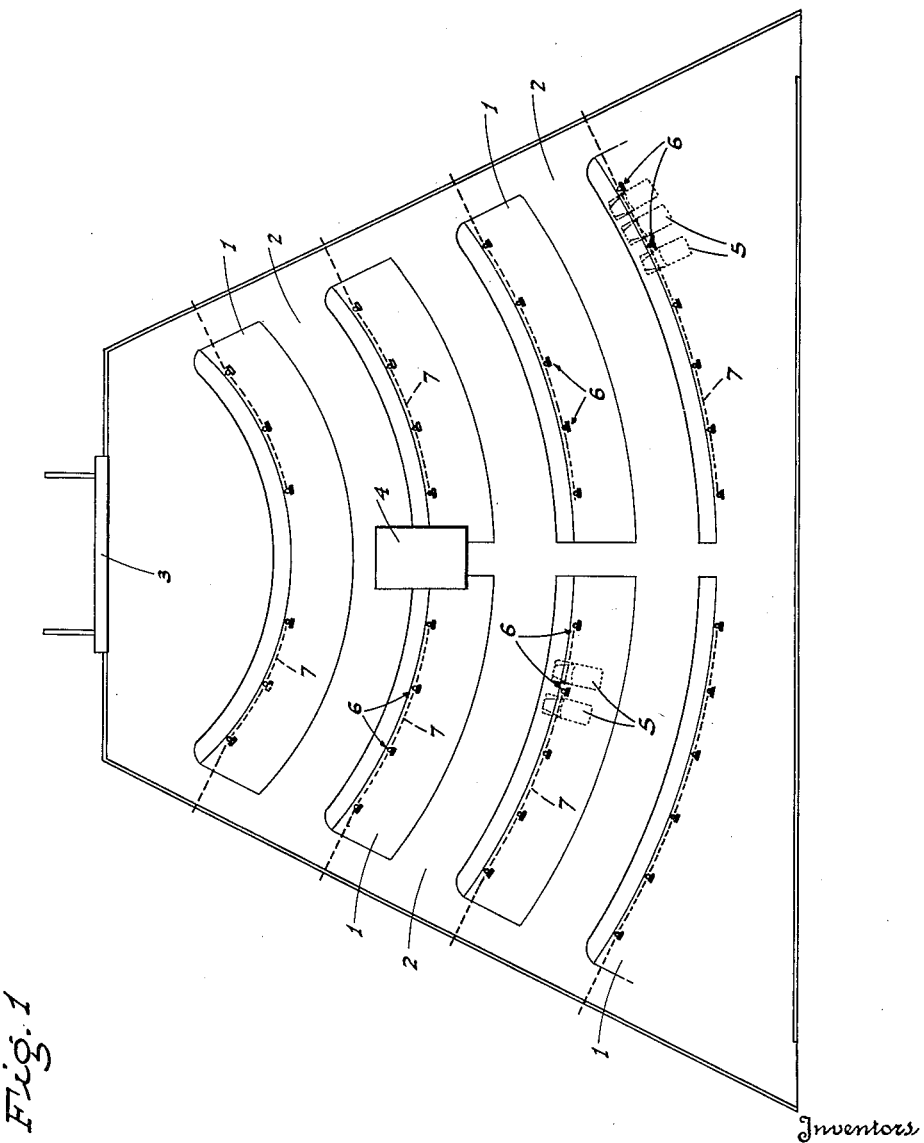
Fig. 1 is a fanciful diagrammatic plan view of a drive-in theater of the type in which the present invention is primarily intended for use.

Referring now more particularly to the characters of reference on the drawings, the present invention is designed, but not limited, for use in connection with an outdoor or drive-in theater of the type shown diagrammatically in Fig. 1. In this type of theater a plurality of arcuate parkways 1 and driveways 2 are formed alternately in front of a large upstanding screen 3 on which a motion picture is shown from a projection booth 4.

Automobiles 5 park in the parkways 1 in side by side relation facing the screen 3 so that the occupants of the automobiles, while remaining in the same, may view the motion picture on said screen.

The parkways 1 are provided, at points which lie between the areas in which adjacent automobiles park, with upstanding air conditioning units, each of which is indicated generally at 6; each unit 6 servicing the pair of automobiles disposed on opposite sides thereof. The air conditioning units 6 are electrically actuated and are supplied with electric current from underground cables 7.

As all of the air conditioning units are alike, a description of one will suffice.

Each air conditioning unit 6 comprises a rigid post 8, fitted at its lower end with a ground engaging base 9 suitably secured in a fixed position.

At its upper end the post 8 supports a horizontal, transversely extending tubular housing 10 of substantial diameter and length. The central portion of the tubular housing 10 is formed as a motor chamber 11 in which an electric motor 12 is mounted; said motor having a double-ended shaft which extends axially of the tubular housing 10. Louvres 13 are formed in the housing 10 in communication with the motor chamber 11 so that air may flow into said chamber, and thence through removable, ported partitions 14 which define the ends of said motor chamber.

Outwardly of the partitions 14 the housing 10 forms blower chambers 15, and a squirrel-cage type blower 16 is disposed in each chamber 15 and mounted on the corresponding shaft end 17 of the motor 12.

The outer ends of the blower chambers 15 are closed by removable partitions 18, and the fresh air which the blowers 16 receive from the motor chamber 11 through the ported partitions 14 is delivered from each blower chamber 15 through an outlet fitting 19 into a flexible hose 20. Each flexible hose 20 is of a length to extend from the air conditioning unit 6 into the adjacent automobile 5.

At the outer end thereof each flexible hose 20 is fitted with an electric heater unit, indicated generally at 21; each electric heater unit 21, when not in use, being removably engaged on, and supported by, a hook 22 transversely pivoted, as at 23, within, and projecting outwardly of, an end case 24 formed on the adjacent end of the housing 10 outwardly of the adjacent partition 18. Each end case 24 includes a hinged door 25 normally held in closed position by a lock 26; such door being slotted, as at 27, for the passage, in vertically movable relation, of the hook 22.

A hood 28 projects outwardly from each end case 24 at the top in protective, overhanging relation to the corresponding heater unit 21 and hook 22.

Inwardly of the pivot 23 each hook 22 is fitted with a mercury type tilt switch 29 which is open when the hook 22 is lowered by engagement of the corresponding heater unit 21 thereon (see Fig. 3). The tilt switches 29 on the hooks 22 are interposed, in the control circuit for the air conditioning unit, in the manner herebefore described.

A tension spring 30 connects between the inner end of each hook 22 and a lower point within the end case 24 whereby to urge the hook 22 to a raised, switch-closing position when the heater unit 21 is removed from such hook.

Figure 4:
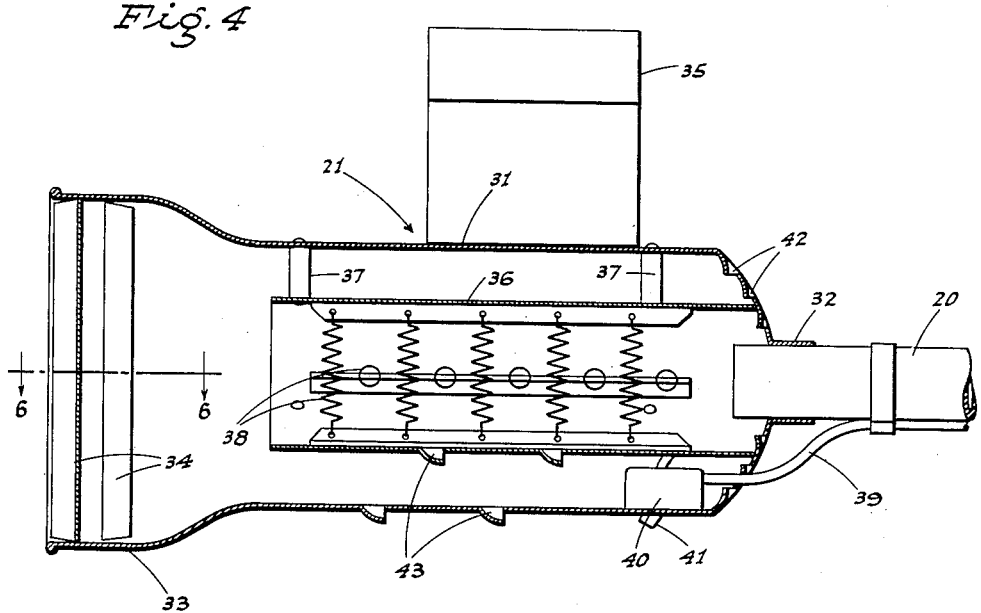
Fig. 4 is an enlarged sectional elevation of one of the heater units.
Figure 5:
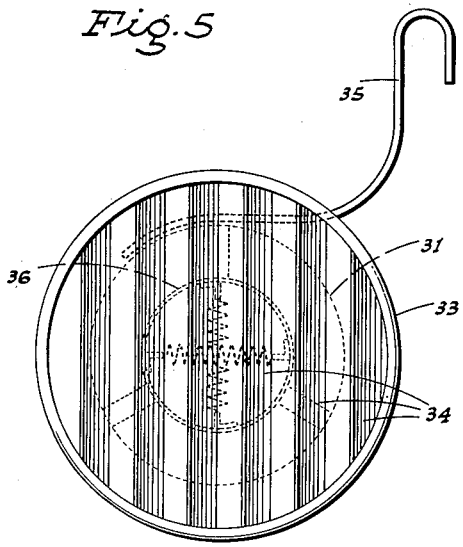
Fig. 5 is a front end view of such heater unit.
Figure 6:
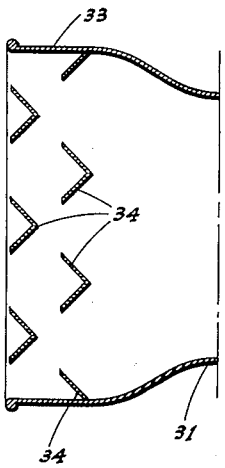
Fig. 6 is a cross section on line 6—6 of Fig. 4.

Each of the heater units 21, as shown in detail in Figs. 4-6, inclusive, is of a size for ready handling and comprises an elongated tubular body 31 having a neck 32 at its rear end attached to the outer end of the corresponding flexible hose 20.

At its forward end the elongated tubular body 31 is enlarged to form a bell 33, and a plurality of staggered air diffusion baffles 34 extend across the bell 33 within the latter.

The baffles 34 are of outwardly opening channel shape, and lap each other whereby to form an effective gain grill.

Intermediate its ends, and on top thereof, the tubular body 31 is fitted with an upstanding, relatively wide hook 35 adapted for engagement over the upper edge portion of the window glass of a door. In this manner the heater unit 21 is effectively supported within the automobile lengthwise thereof; the flexible hose 20 entering the automobile over the top of the window glass on which the hook 35 is engaged.

A mounting sleeve 36, of considerably lesser diameter than the tubular body 31, is fixed axially and concentrically in the latter by means of radial connections 37 preferably of non-heat conducting material.

Within the same the mounting sleeve 36 supports an electric resistance or heating wire assembly 38, which is adapted to be energized from wires which are carried in a flexible cord 39 which leads along the corresponding hose 20 from the post supported housing 10. At the outer end of the hose 20 the flexible cord 39 enters the body 31 for connection of its wires to the heating assembly 38; there being an on-off switch 40 interposed in the cord 39 directly ahead of the heating assembly 38, and such switch includes an actuating element 41 accessible from exteriorly of said body 31.

At its rear end the body 31 includes air vents 42, which permits air to enter the body and flow between the same and the sleeve 36 whereby said body is maintained relatively cool.

Additionally, the bottom of the body 31 and sleeve 36 is formed with moisture escape vents 43.

When each electric heater unit 21 is removed from its hook 22 and suspended in the adjacent automobile, the electric motor 12, as well as the heating wire assembly 38 in such heater unit, is energized. This results in the motor 12 and the related blower 16 feeding fresh air into the corresponding flexible hose 20, which fresh air flows through the heater unit 21 into the automobile. As the air flows through such heater unit it is warmed, so as to maintain the temperature within the automobile at a comfortable degree. Should the temperature in the automobile become too great, an occupant need only snap off the switch 40, whereupon fresh air will continue to flow into the automobile but without heating.

Another advantage of the device is that the automobile is not only heated but the windows, particularly the windshield, are defrosted so that a clear view of the screen 3 is maintained.

Upon each heater unit 21 being removed from the adjacent automobile it is returned to the corresponding hook 22, causing deenergization of the corresponding heating wire assembly 38 of said heater unit. However, a circuiting arrangement is employed which does not break the circuit for the electric motor 12 until both heater units 21 are on their respective hooks 22 and both tilt switches 29 open. Thus, should only one heater unit 21 be out of use and on its hook 22, the motor 12 continues to function in order to deliver air through the hose 20 and heater unit 21 at the opposite end of the air conditioning unit.

One circuit which may be employed to the accomplishment of the above result is shown diagrammatically in Fig. 7, wherein:

The motor 12 is direct-connected to an electric supply circuit 44 having a normally open relay switch 45 interposed therein.

Each tilt switch 29 and the corresponding heating wire assembly 38 are connected in series in a heater unit circuit 46 connected to the electric supply circuit 44; the tilt switches 29 being normally open, as previously described. The on-off switches 40 on the heater units 21 are interposed in the corresponding circuits 46 between the corresponding tilt switch 29 and heating wire assembly 38; the switches 40 being normally closed. The portion of each circuit 46 between the tilt switch 29 and on-off switch 40 includes the wires which extend in the corresponding flexible cord 39.

A relay control circuit 47 is connected between the relay switch 45 and the heater circuits 46 in a manner so that when either or both of the tilt switches 29 are closed, the relay control circuit 47 energizes the relay switch 45 to close the latter and cause operation of the electric motor 12. In other words, when either or both heater units 21 are lifted from their hooks 22, the motor driven blower assembly immediately begins to function automatically, and continues to do so until both of said heater units are returned to their hooks to cause breaking of said relay control circuit 47. With this arrangement the attendant need not give any attention to starting or stopping of the motor-driven blower assemblies of the air conditioning units; this being very desirable in an installation, as in a drive-in theater, wherein a large number of such air conditioning units are employed.

The electric supply circuit 44 may include a fuse block 48, and similarly fuse blocks 49 are interposed in the heater unit circuits 46; the fuse blocks 49 being those shown in Fig. 3.

The invention provides a practical and convenient device for supplying fresh heated air to automobiles when parked as in drive-in-theaters; or, when desired, fresh unheated air when needed solely for ventilation.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In an outdoor theatre having a screen and an area adjacent thereto comprising a plurality of parkways in which automobiles may be parked, a system for conveying conditioned air to an automobile standing in one of said parkways, said system comprising a supporting member disposed adjacent the parkway, a housing disposed on said supporting member, a motor driven fan disposed in said housing, an electric circuit leading to the motor of said fan from a point remote from the supporting member, a tubing leading from the housing, such tubing being of such a length as to permit the free end of the tubing to be projected into the said automobile, an electrical heating element associated with the tubing, such heating element being included in said motor circuit, and switch means for controlling the flow of current to the motor and to said heating element; said switch means including a switch in the circuit, a lever pivoted adjacent the supporting member for vertical swinging movement, the lever being associated with the switch and effective to open the switch when the lever is in its lowermost position and to close the switch when the lever is in its uppermost position, yieldable means normally tending to swing the lever to its uppermost position, and means adjacent the outer end of the tube and adapted to be suspended on the outer end of the lever and being effective to pull the lever to its lowermost position.

2. In an outdoor theatre having a screen and an area adjacent thereto comprising a plurality of parkways in which automobiles may be parked, a system for conveying conditioned air to an automobile standing in one of said parkways, said system comprising a supporting member disposed adjacent the parkway, a housing disposed on said supporting member, a motor driven fan disposed in said housing, an electric circuit leading to the motor of said fan from a point remote from the supporting member, a tubing leading from the housing, such tubing being of such a length as to permit the free end of the tubing to be projected into the said automobile, a tubular body disposed on the end of the tube and being in communication therewith, an electric heating element mounted in the body, said element being included in the motor circuit, switch means for controlling the flow of current to the motor and to said element, such switch including one switch operative to control flow of current to both the motor and element, and a separate switch in the circuit adjacent the tubular body operative to independently control the flow of current to the element.

3. In an outdoor theatre having a screen and an area adjacent thereto comprising a plurality of side by side parkways in which automobiles may be parked, a system for conveying conditioned air to automobiles standing in said parkways, such system comprising a supporting member disposed between adjacent ones of said parkways, a housing disposed on each side of the supporting member, a single motor mounted on the supporting member, an electric circuit leading to the motor from a point remote from the supporting member, a fan in each housing connected in driven relation with the motor, a tubing leading from each housing, each tubing being of such a length that its outer end may be projected into an automobile standing in an adjacent parkway, a heating element associated with each tubing, each heating element being included in said motor circuit, switch means for controlling the flow of current to the motor and to said heating elements, such switch means including means to effect discontinuance of the flow of current to one element without interrupting the flow of current to the other element and the motor.

WILLIAM S. OFTEBRO.
WILLIAM E. FLEMING.

REFERENCES CITED

The following references are of record in the file of this patent:

UNITED STATES PATENTS

| Number | Name | Date |
| --- | --- | --- |
| 2,027,605 | McCord et al. | Jan. 14, 1936 |
| 2,091,594 | Innes | Aug. 31, 1937 |
| 2,230,020 | Webster | Jan. 28, 1941 |
| 2,463,339 | Wetzel | Mar. 1, 1949 |
| 2,469,986 | Phyfe | May 10, 1949 |
| 2,521,654 | Sandler | Sept. 5, 1950 |
| 2,529,425 | Sharp | Nov. 7, 1950 |
| 2,537,330 | Carroll | Jan. 9, 1951 |

OTHER REFERENCES

Article by C. F. Boester, "Air Conditioned Drive-In Theaters," Heating and Ventilating, July 1949, pp. 57–58.